United States Patent
Oguro

(12) 
(10) Patent No.: US 6,301,065 B1
(45) Date of Patent: Oct. 9, 2001

(54) METHOD FOR RECORDING AND REPRODUCING CRT VARIOUS TYPES OF DATA SO AS TO PERMIT THE USE OF THE SAME MECHANICAL AND SERVO SYSTEMS THEREOF

(75) Inventor: Masaki Oguro, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/480,934

(22) Filed: Jun. 7, 1995

Related U.S. Application Data

(63) Continuation of application No. 08/159,238, filed on Nov. 30, 1993, now abandoned.

(30) Foreign Application Priority Data

Dec. 4, 1992 (JP) .................................................. 4-325618
Apr. 5, 1993 (JP) .................................................. 5-078094

(51) Int. Cl.⁷ .................................................. G11B 5/008
(52) U.S. Cl. .................................................. 360/19.1
(58) Field of Search ...................... 360/40, 48, 19.1, 360/27, 51, 10.3, 722, 32, 78.02, 13, 77.14, 64, 69; 358/310

(56) References Cited

U.S. PATENT DOCUMENTS

| | | | |
|---|---|---|---|
| 4,338,644 | * 7/1982 | Staar | 360/69 X |
| 4,554,599 | 11/1985 | Shiozaki | 360/69 |
| 4,559,568 | * 12/1985 | Watanabe et al. | 360/48 |
| 4,683,503 | 7/1987 | Takimoto | 360/64 |
| 4,748,517 | 5/1988 | Shibata et al. | 358/310 |
| 4,843,490 | 6/1989 | Haragushi | 360/69 |
| 4,862,295 | * 8/1989 | Tanaka et al. | 360/48 |
| 5,134,529 | * 7/1992 | Inazawa et al. | 360/40 X |

FOREIGN PATENT DOCUMENTS

| | | |
|---|---|---|
| 323890 | * 12/1989 | (EP) . |
| 0 421 871 | 4/1991 | (EP) . |
| 0 427 369 | 5/1991 | (EP) . |
| 0 553 817 | 8/1993 | (EP) . |
| 572953 | * 8/1993 | (EP) . |
| 0 572 953 A1 | 12/1993 | (EP) . |
| 595558 | * 4/1994 | (EP) . |
| 600467 | * 8/1994 | (EP) . |
| 600496 | * 8/1994 | (EP) . |
| 600493 | * 8/1997 | (EP) . |
| 91/02355 | 2/1991 | (WO) . |

OTHER PUBLICATIONS

Liebhold, M., "Toward An Open Environment For Digital Video", *Communications of the Association for Computing Machinery*, Apr. 1991, vol. 34, No. 4, p. 106, col. 3 to p. 107, col. 1.

* cited by examiner

*Primary Examiner*—David Hudspeth
(74) *Attorney, Agent, or Firm*—Frommer Lawrence & Haug LLP.; William S. Frommer; Gordon Kessler

(57) ABSTRACT

An application ID is recorded in a timing sector at an entrance end of a track on a recording medium for stipulating a data structure for the respective track including a determined number of areas into which the remainder of the track is divided, the positioning of those areas, and the arrangements of Sync. blocks and error correcting codes (ECC) in the areas. Further, each of the areas into which the track is divided in addition to the timing sector is provided with a respective application ID for determining the data structure in the respective area.

8 Claims, 11 Drawing Sheets

TS Appli(APT) 0000 Determines Below Data Structure in Each Track on Tape

| Application ID in Each Area | | | | |
|---|---|---|---|---|
| AP 1 | Meaning | | AP 2 | Meaning |
| 0000 | Adopts Data Structure of AAUX Audio and ID of CVCR | | 0000 | Adopts Data Structure of Video and of CVCR |
| Other | RSV | | 0001 | Adopts Data Structure of Video Audio and AUX of ATV VCR |
| | | | Other | RSV |
| AP 3 | Meaning | | | |
| 0000 | Adopts Data Structure of Sub Code and ID of CVCR | | CVCR : Consumer Video Cassette Recorder | |
| Other | RSV | | ATV : Advanced TV | |

FIG. 6

Application IDs

CVCR (SD, HD)

| TS | APT | 0000 |
|---|---|---|
| Mic | APM | 0000 |
| Area 1 | AP1 | 0000 |
| Area 2 | AP2 | 0000 |
| Area 3 | AP3 | 0000 |

ATV VCR

| TS | APT | 0000 |
|---|---|---|
| Mic | APM | 0000 |
| Area 1 | AP1 | 0000 |
| Area 2 | AP2 | 0001 |
| Area 3 | AP3 | 0000 |

Data Streamer

| TS | APT | 0001 |
|---|---|---|
| Mic | APM | 0001 |

Multi Track Audio Tape Recoder

| TS | APT | 0002 |
|---|---|---|
| Mic | APM | 0002 |

High Order (TS, Mic) Hierarchy 0 0 0 0 : CVCR
0 0 0 1 : Data Streamer
0 0 1 0 : Multi ATC
Other : RSV Low-Order Hierarchy (When High Order Hierarchy=0000)

0 0 0 0 : CVCR
0 0 0 1 : ATV
Other : RSV

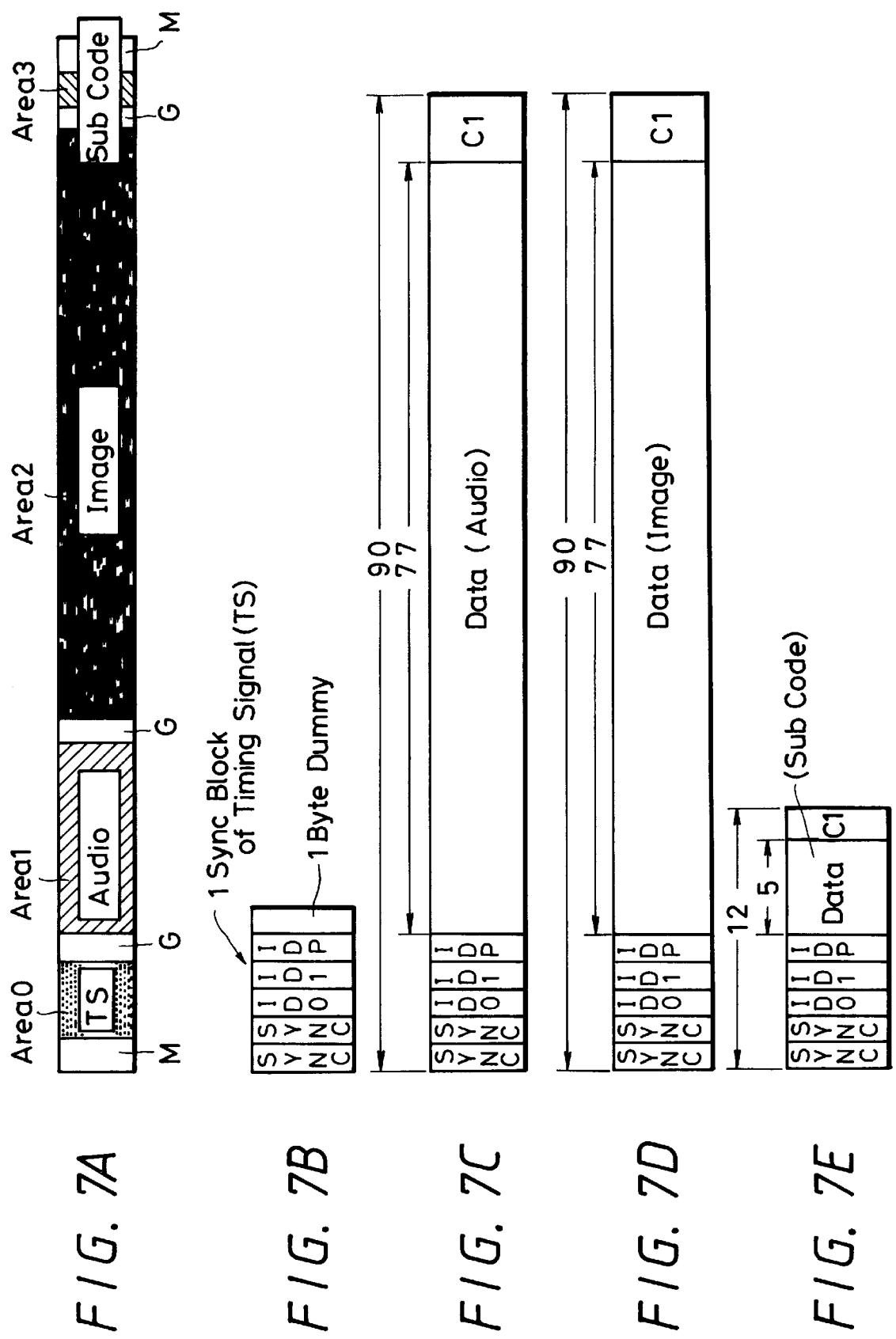

FIG. 9A

| BUF0 | BUF1 | BUF2 | BUF3 | BUF4 | BUF5 | BUF6 | BUF7 | BUF8 | BUF9 | BUF10 | BUF11 | BUF12 | BUF13 | BUF14 | BUF15 | BUF16 | BUF17 | BUF18 | BUF19 | BUF20 | BUF21 | BUF22 | BUF23 | BUF24 | BUF25 | BUF26 | C2 |
|---|---|---|---|---|---|---|---|---|---|---|---|---|---|---|---|---|---|---|---|---|---|---|---|---|---|---|---|
| | | | | | | | | | | | | | C1 | | | | | | | | | | | | | | |

BUF0 ~ BUF26

| SYNC | DID | DBN | DO | AUX0 | AUX1 | Video Data | C1 |
|---|---|---|---|---|---|---|---|

The first half → ← The second half

| SWP3 |
| SWP2 |
| SWP1 |
| SWP0 |
| ONO3 |
| ONO2 |
| ONO1 |
| ONO0 |

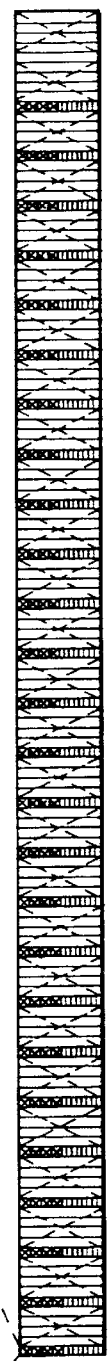
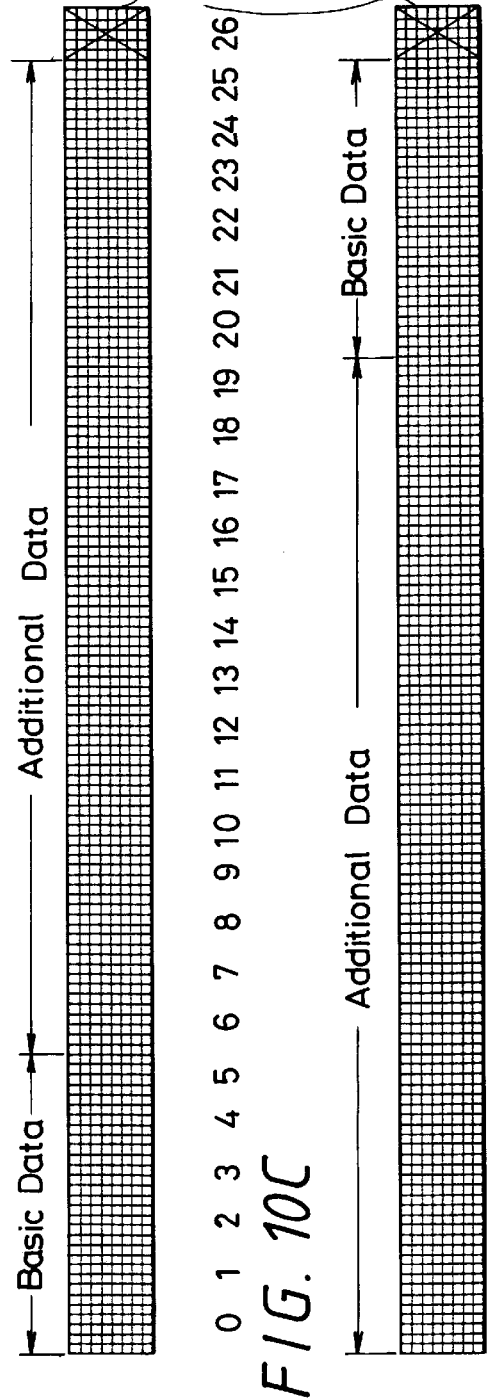
FIG. 10A
FIG. 10B
FIG. 10C

FIG. 12A (TS)

| ID0 | ID1 |
|---|---|
| 1 | RSV |
| 1 | RSV |
| SP/LP | SYNC 5 |
| RSV | SYNC 4 |
| APPLI 3 | SYNC 3 |
| APPLI 2 | SYNC 2 |
| APPLI 1 | SYNC 1 |
| APPLI 0 | SYNC 0 |

FIG. 12B (AUDIO)

| ID0 | ID1 |
|---|---|
| 0 | RSV |
| 1 | RSV |
| FRID | RSV |
| TRACK4 | RSV |
| TRACK3 | SYNC 3 |
| TRACK2 | SYNC 2 |
| TRACK1 | SYNC 1 |
| TRACK0 | SYNC 0 |

FIG. 12C (IMAGE)

| ID0 | ID1 |
|---|---|
| 0 | SYNC 7 |
| 0 | SYNC 6 |
| FRID | SYNC 5 |
| TRACK4 | SYNC 4 |
| TRACK3 | SYNC 3 |
| TRACK2 | SYNC 2 |
| TRACK1 | SYNC 1 |
| TRACK0 | SYNC 0 |

FIG. 12D (SUBCODE)

| ID0 | ID1 |
|---|---|
| 1 | CTID 3 |
| 0 | CTID 2 |
| CTID 9 | CTID 1 |
| CTID 8 | CTID 0 |
| CTID 7 | SYNC 3 |
| CTID 6 | SYNC 2 |
| CTID 5 | SYNC 1 |
| CTID 4 | SYNC 0 |

METHOD FOR RECORDING AND REPRODUCING CRT VARIOUS TYPES OF DATA SO AS TO PERMIT THE USE OF THE SAME MECHANICAL AND SERVO SYSTEMS THEREOF

This application is a continuation of application Ser. No. 08/159,238, filed Nov. 30, 1993, now abandoned.

BACKGROUND OF THE INVENTION

1. Field of the Invention

This invention relates generally to a method of encoding a signal and then digitally recording and reproducing the same.

2. Description of the Prior Art

Various devices exist for encoding and recording and reproducing video and audio signals. Further, it has been proposed to provide apparatus for encoding and recording and/or reproducing video and/or audio signals and which includes a servo system, a system controller and mechanical structures necessary for that purpose, and which may be alternatively employed for recording and reproducing computer data or the like other than video or audio signals. For example, an apparatus for recording and reproducing audio signals of the DAT format has also been proposed for recording and reproducing computer data.

In such DAT apparatus, a main data area includes 2 ID areas each of 2 bits (that is, a total of 4 bits) positioned in each synchronizing period. Included in these ID areas is a 2-bit format ID which indicates whether the recorded signal is in the DAT audio format or in the DDS format, that is, the format of a data streamer using DAT. In the DAT apparatus, each oblique track on the recording tape has subcode areas on its opposite end portions. Data ancillary to the audio or computer data recorded in the main data area of the track are recorded in and reproduced from the subcode areas. However, the format ID is not recorded in the subcode areas. In other words, in the DAT apparatus, the format ID recorded in the ID areas of the main data area determines whether data recorded in such main data area is an audio signal or computer data.

The rapidly developing so-called "digital world", that is, the wide spread employment of digital devices for performing many different functions, makes apparent the desirability of providing a digital platform that can be used in common for different kinds of digital data. The DAT and DDS are examples of such a digital platform. However, the format ID of the conventional DAT apparatus is comprised of only 2 bits. Since two of the possible combinations of these 2 bits have already been employed for identifying the DAT audio format and the DDS or data streamer using DAT, respectively, the further expansion of the applications of the DAT apparatus as a digital platform is severely limited.

OBJECTS AND SUMMARY OF THE INVENTION

Accordingly, it is an object of this invention to provide a method for recording and reproducing various types of data in such a manner as to permit the use of the same mechanical and servo systems and at least some of the same electrical components for such purposes.

In accordance with an aspect of this invention, in a method for recording and reproducing information signals in a track on a recording medium, a timing area is provided in the track for defining an after-recording area in a recording format, and an identification signal is added to such timing area and stipulates a data structure for the entire track.

In accordance with another aspect of the invention, in a method for recording and reproducing encoded signals in respective areas of a track on a recording medium, a recording format is provided which includes spaces for data which are ancillary to the encoded signals and which are recorded and reproduced simultaneously with the encoded signals, and there are added, in the spaces for the ancillary data, identification signals which stipulate the data structure of the encoded signals as recorded in the respective areas of the track.

According to still another aspect of the invention, in a method for recording and reproducing information signals, a memory is provided for storing data characterizing the recorded information signals, and there is stored, at a predetermined location in the memory, an identification signal which stipulates a structure of data in the memory. Such memory is desirably contained in a cassette which further contains a tape or other recording medium on which the information signals are recorded in a track, and there is further recorded in the track an additional identification signal which stipulates a data structure for the track and which is desirably the same as the identification signal stored in the memory in the cassette (MIC).

Furthermore, it is a feature of this invention that, when the identification signal provided in the timing area at the entrance end of a track stipulates a data structure for that track in which additional areas are provided in succession for the recording of the information signals and data ancillary thereto, there are further added to the ancillary data in the additional areas respective additional identification signals which stipulate data structures for the information signals recorded in the respective additional areas.

By reason of the foregoing aspects and features of the methods embodying the invention, it is made possible to produce commercial products for recording and reproducing different types of data, and which have in common certain mechanisms and servo systems, and also certain electrical circuit components.

The above, and other objects, features and advantages of the invention, will be apparent in the following detailed description of preferred embodiments when read in connection with the accompanying drawings.

BRIEF DESCRIPTION OF THE DRAWINGS

FIG. 6 is a diagram showing application IDs to be applied to the timing sector (TS) and memory in cassette (MIC) for various products so as to provide a digital platform in accordance with the invention;

FIG. 7A is a diagram showing the recording format for one track in a CVCR, and FIGS. 7B–7E are diagrams illustrating synchronizing blocks of timing, audio, image and subcode signals recorded in respective areas of such track format;

FIGS. 9A and 9B are diagrams showing a data structure of an image or video signal recorded on one track;

FIGS. 10A–10C are diagrams showing a data structure of ancillary data of an image or video signal recorded on one track;

FIGS. 12A–12D are diagrams showing a data structure of IDs in synchronizing areas of timing, audio, image and subcode signals, respectively, recorded on one track.

DETAILED DESCRIPTION OF PREFERRED EMBODIMENTS

Figure 1A:
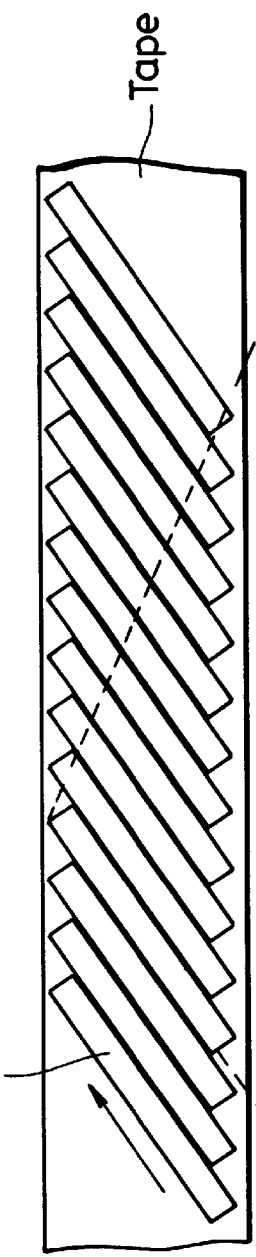
FIG. 1A is a diagrammatic view of a tape on which signals are recorded in oblique tracks, as by a digital signal recording and reproducing method according to the present invention.
Figure 1B:
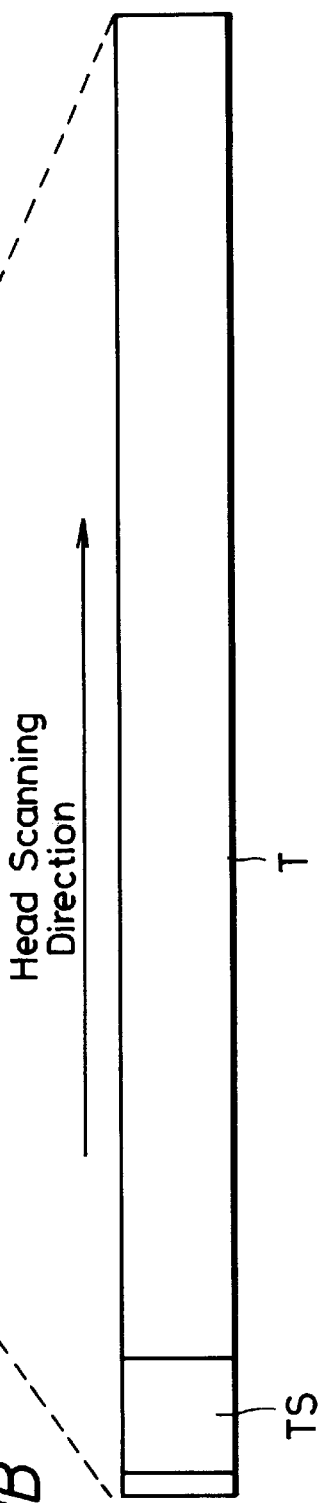
FIG. 1B is an enlarged view of one of the tracks shown on FIG. 1A.

Referring initially to FIG. 1A, it will be seen that, when operating a helical scan digital signal recording and reproducing apparatus of a type in which the method embodying this invention may be advantageously employed, a rotary head or heads (not shown) scans successive tracks T extending obliquely across a recording medium, for example, in the form of a tape. As shown in FIG. 1B, during recording, each track T is provided, at its entrance end, that is, at the end portion first contacted by a head, with a timing block or sector TS. The timing sector TS, some times referred to as an insert and tracking information (ITI) sector, is provided to position following areas accurately when data written in these following areas are rewritten by after recording. More specifically, a number of sync. blocks of a short sync. length, for example, a 6-byte length, are written in the area TS, and numbered successively from the entrance end of the track. During after recording, detection of a certain sync. block in the TS area allows the present position along the track to be determined accurately from the number written in the detected sync. block. Thereafter, the area of after recording can be accurately located on the basis of such determined present position.

Since the entrance ends of the tracks may not be stably contacted by the head due to limited mechanical accuracy, the sync. length is reduced and many timing blocks are written in the area or sector TS for higher detecting probability.

A person obliged to assign his proposals to the assignee of the present application has proposed that a cassette containing the tape or other recording medium for use in the above digital recording and reproducing apparatus be provided with a circuit board having a memory IC mounted thereon. When such cassette is loaded into the apparatus, data written in the memory IC is read to assist in recording and reproducing signals on the tape in the cassette, for example, as disclosed further in Japanese Patent Applications Nos. 4-165444 and 4-287875. The data written in the memory IC, which is referred to as a memory in cassette (MIC), may, for example, identify the type of data recorded on the tape and the amount of space remaining on the tape.

As hereinafter further described, the present invention is applicable to the above referred to digital signal recording and reproducing apparatus and to an MIC which can be loaded therein.

Figure 2A:
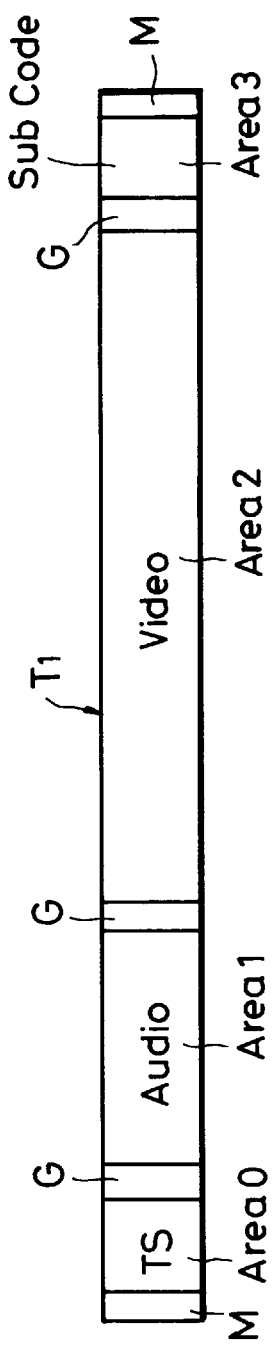
FIGS. 2A and 2B are views similar to that of FIG. 1B, but showing additional areas provided on each track for the recording of information signals in accordance with respective embodiments of the invention.
Figure 4:
FIG. 4 is a diagram illustrating meanings ascribed to various values of the application IDs recorded in the respective areas of a track having the structure shown on FIG. 2A.
Figure 5:
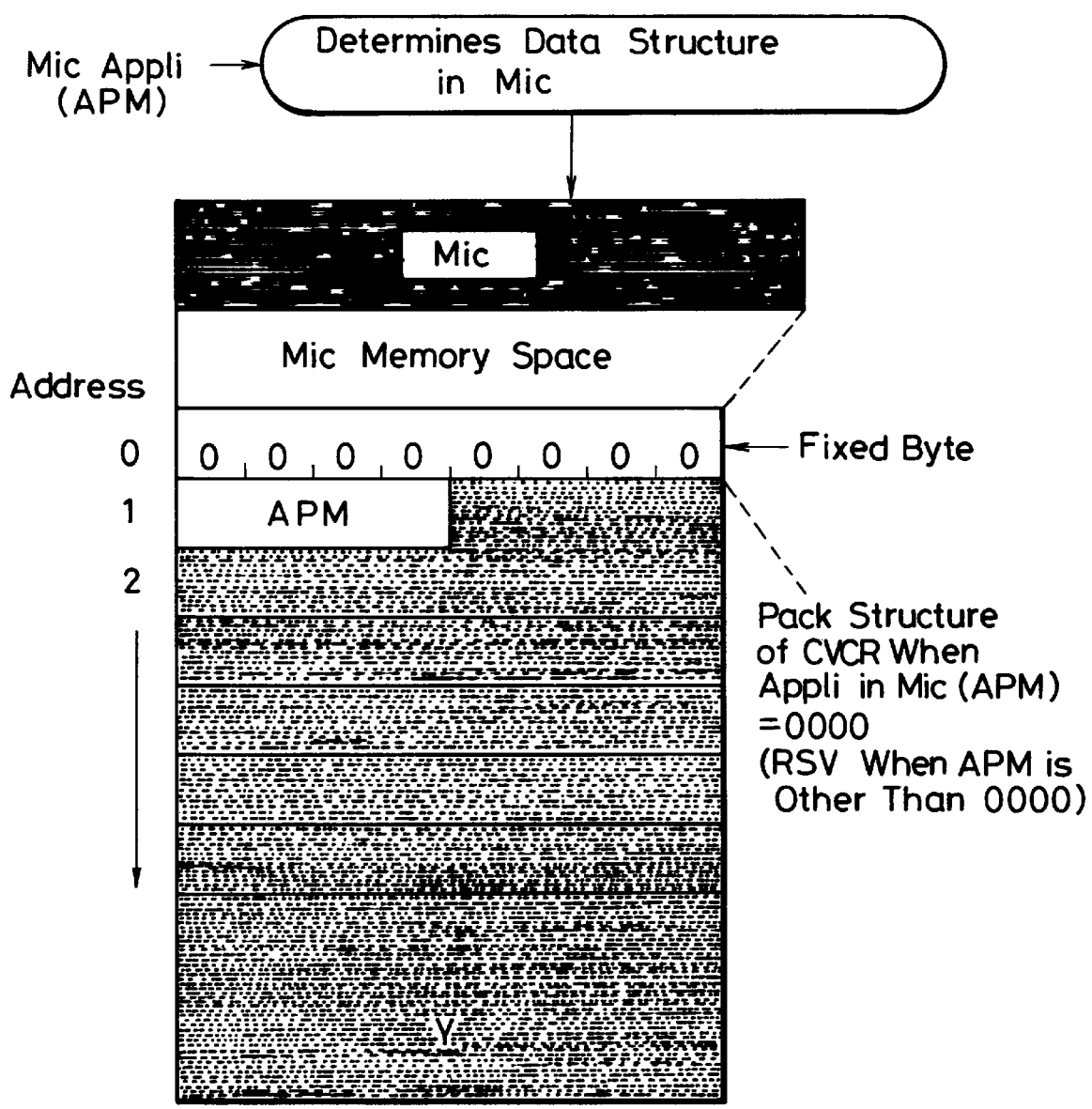
FIG. 5 is a diagram showing a data structure stipulated by an application ID in a memory in cassette (MIC) in accordance with another embodiment of the invention.

Generally, in accordance with the present invention, an identification signal of at least three bits, referred to as an application s provided for defining the data structure. For example, an application ID of a track, hereinafter referred to as an APT, is provided in the timing sector TS and defines the data structure of the respective track, as shown in FIGS. 2A and 4. Similarly, as shown in FIG. 5, an application ID of a memory in cassette (MIC), hereinafter referred to as an APM, is provided at a predetermined address in the memory and defines the data structure of the MIC. Although each application ID is stated above to be comprised of at least three bits for providing a sufficient range of different data structures definable thereby, that range can be increased, if desired, by employing four or more bits for each application ID. However, there appears to be no reason in the foreseeable future to use more than six bits for each application ID.

The invention will now be specifically described as applied to an embodiment in which the application ID of a track, that is, the APT, is comprised of four bits, and defines the number n of areas, in addition to the timing sector or area TS, into which the respective track is divided. The APT further defines the positions of the n areas and the arrangements of sync. blocks and error correcting codes (ECC) in such areas. For example, if APT=0000 is used to define the data structure for a track $T_1$ (FIG. 2A) recorded in a consumer digital VCR (CVCR), such track containing APT=0000 in its timing sector TS identified as area 0 is indicated thereby to be further divided into n=3 additional areas identified as area 1, area 2 and area 3, respectively, arranged in order in the direction away from the entrance end of the track with interblock gaps G disposed between adjacent areas and margins M at the opposite ends of the track.

Figure 2B:
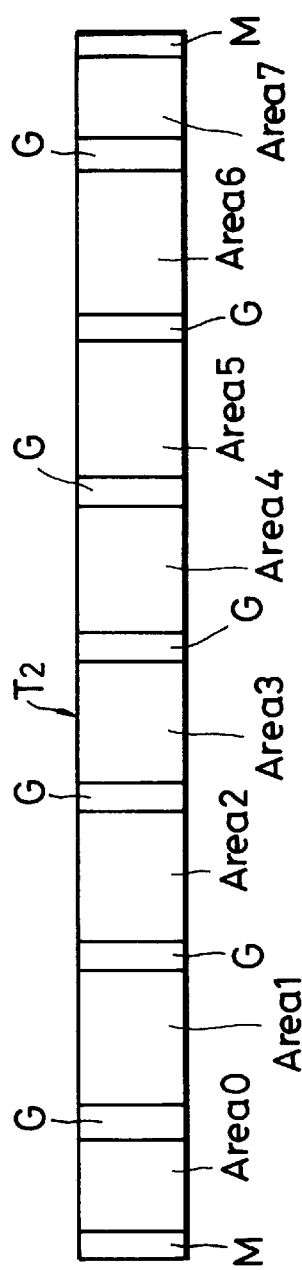

Of course, other values of APT may be employed in the timing sector or area 0 of a track for indicating that such track is divided into more or less than three additional areas. For example, as shown in FIG. 2B, area 0 of the track $T_2$ may contain an APT which indicates n=7, that is, the presence of eight areas respectively numbered 0–7.

In addition to determining the number n of the areas (other than the area 0) into which the track is divided, the APT determines the positions of those n areas and the arrangements of the sync. blocks and error correcting codes (ECC) therein. As indicated on FIG. 2A, for the CVCR, the area 1, area 2 and area 3 of the track T, are respectively audio, video and subcode sectors.

Figure 3:
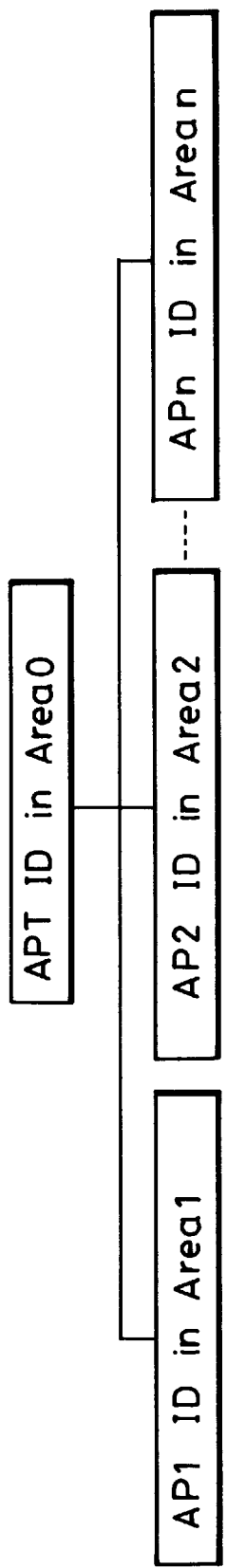
FIG. 3 is a diagram illustrative of a hierarchical structure of application IDs recorded in respective areas of the track shown in FIG. 2A.

Each of the n areas, that is, each of area 1, area 2 and area 3 in FIG. 2A, has its own application ID which defines the data structure of the respective area. In other words, APi, which is the application ID for an area i (i=1, 2, . . . n), defines the data structure in the respective area i which is not determined on the basis of the application ID for the track. Thus, in the case of APT=0000 illustrated in FIG. 2A, area 1, area 2 and area 3 contain application IDs AP1, AP2 and AP3, respectively, (FIG. 3), for determining data structures in the respective areas. As shown in FIG. 3, the various application IDs have a hierarchical structure. In other words, the application ID APT in the timing sector TS within area 0 specifies the number n of areas into which the track is further divided, and each of such n areas contains an application ID APi for specifying the data structure within the respective area.

If, as earlier assumed, the track data structure of a digital video and audio signal recording and reproducing apparatus for home use (CVCR) is defined by APT=0000 in the timing sector TS (area 0), and if AP1, AP2 and AP3 in the three areas (area 1, area 2 and area 3) stipulated by APT=0000 are also defined by 0000, then the data structures adopted for areas 1, 2 and 3 are as shown on FIG. 4.

More specifically, if AP1=000 in the area 1 there is adopted, for the area 1, a data structure of AUDIO (audio data) and of AAUX (auxiliary audio data) characteristic of the CVCR. If AP2=0000, there is adopted for the area 2 a data structure of VIDEO (video data) and VAUX (video auxiliary data) characteristic of the CVCR. Finally, if AP3= 0000, there is adopted for the area 3 of the track, a data structure of SUBCODE and IDs (such as FR ID for identifying the first or second half of a frame, and TAG IDs). In other words, if APT=0000 and if each of AP1, AP2 and AP3 is also 0000, then digital video and audio signal recording and reproducing can be effected for home use, as in the CVCR, in accordance with this invention.

If, as shown on FIG. 4, AP2=0001 in area 2, this indicates that the data structures of the video and audio signals of so-called advanced TV (ATV) in the U.S. are to be adopted. ATV, which is expected to have some practical exploitation in the near future, employs compression techniques for the image and audio signals, and a transfer rate of at most about 20 Mbps (bps is bits per second).

It has been general knowledge that image or video signals are recorded and reproduced using a compression technique in a digital image and audio signal recording and reproducing apparatus for home use (CVCR). The transfer rate for such compression technique is about 25 Mbps. The area 2 which is prepared to record signals at 25 Mbps, can naturally record ATV signals at the lower transfer rate of 20 Mbps.

By using the method according to the present invention, an ATV signal recording and reproducing apparatus can employ the same cassette and mechanical structures and an electrical circuit using at least some of the same ICs and LSI circuits as those in a digital video and audio signal recording and reproducing apparatus for home use (CVCR) except that, in the area 2 of each track on the tape, the digital video signals recorded by a CVCR are replaced by ATV digital signals. In other words, it is not necessary to develop an ATV signal recording and reproducing apparatus that is completely different from the existing CVCRs.

Any digital data can be recorded in the areas 1, 2, 3 shown in FIG. 4 by varying the values of the respective application IDs AP1, AP2 and AP3. As a result, commercial products can be constructed that are freely adoptable for various different applications.

Those applications which cannot be achieved with the three areas positioned in each track as defined by APT=0000 and with the respective sync. block and ECC arrangements also defined by that value of APT, can be realized by setting the APT in the area 0 to other than 0000. At such time, it is necessary to newly determine a data structure on each track that is suitable for the desired application. However, even in that case, it is possible to use without change the same cassette and the same mechanism as are employed in a digital image and audio signal recording and reproducing apparatus for home use, and the servo system and the TS area generating and detecting circuit of the latter can also be employed as they are.

As earlier noted, the application ID in an MIC, that is, the APM, defines the data structure in an MIC memory. More specifically, as shown in FIG. 5, fixed data 00000000 is stored at an address 0 in an MIC memory space for detecting a fault in an MIC communication line. The MIC communication line is always kept at an "H" level by a pull-up resistor. In the event of a wire break or contact failure, data read from the MIC will always be 11111111. Such a fault can be detected by writing 00000000 at the address 0 which is accessed first and will be read in the absence of a wire break or contact failure.

The APM in the MIC is stored in the four high-order bits at the next address 1. When APM=0000, the inside of the memory is arranged the same as the pack structure used in a CVCR or digital image and audio signal recording and reproducing apparatus for home use. When APM is not 0000, the memory has a respective data structure that is individually determined. At the present time, only the eight bits at the address 0 and the four high-order bits at the address 1 are to be fixed and the other areas of the memory, which are shown stippled, are left open or reserved for future use as they may be needed.

The relationship between APM in an MIC and APT in the timing sector TS of a track will now be described. In the case of an APT, neither that application ID nor any data are written in any area of the tape prior to the recording thereof. Therefore, the APT and its location in the timing sector TS are uniquely determined by how data is recorded on a track by a digital signal recording and reproducing apparatus. Since MIC data is also recorded and reproduced by the digital signal recording and reproducing apparatus, it is that apparatus which determines the application ID to be recorded both as the APM in the MIC and the APT to be recorded in the timing sector TS.

The values of APM in MIC and of APT in TS should agree with each other, as shown in FIG. 6 for applications to a digital signal recording and reproducing apparatus for home use (CVCR), an advanced television VCR (ATV), a data streamer and a multi track audio tape recorder (multi ATC). Although it may be possible to provide a commercial product with different values for APT and APM, for example, APT=0110 and APM=0000, the below problems arise therefrom in practice.

If two different commercial products have different values of APT recorded in the timing sector TS but the same value of APM in the MIC, then it cannot be determined whether or not data can be recorded on the tape in the MIC simply by checking the APM on the memory in the MIC. Rather, it is necessary to check the APT in the timing sector TS of a recorded track which requires loading of the tape or other recording medium. If the head scans an unrecorded area, the recording medium has to be fed or rewound fast to search for a recorded area. Such products are not commercially practical.

Referring again to FIG. 6, which diagrammatically illustrious a commercially practical digital platform, it will be understood that, with the APM in an MIC and the APT in the timing sector TS of a track in agreement with each other for respective applications, as shown, when for example a CVCR cassette is inserted into a data streamer, the APM in the MIC is detected as being for a CVCR and erroneous operation is prevented, as by ejecting the cassette for preventing data from being recorded in error. In other words, the APM=0000 in the MIC of the inserted CVCR cassette is detected to be out of agreement with the APM=0001 shown to be required for a data streamer.

Upon shipment of an MIC from the factory, data "11111111" indicating no information is written as the application ID in the MIC. Thereafter, a digital signal recording and reproducing apparatus checks the data in the MIC and writes its own APM therein only when the checked data is "11111". If the checked data is other than 1111, the digital signal recording and reproducing apparatus concludes that data is already recorded as the APM in the MIC memory.

Practical details of a method of operating a digital image and audio signal recording and reproducing apparatus in accordance with an embodiment of the present invention will be described below. It is assumed in the following description that an audio signal is recorded in the area 1 shown in FIG. 7A, an image signal is recorded in the area 2, and a subcode is recorded in the area 3. Further, margins M are provided at opposite ends of the track and, between the margins, there are written, successively from the entrance end, a timing block or sector TS for reliably effecting after recording, an audio signal, a video signal and a subcode, with interblock gaps G and a preamble and a postamble for preventing erase failures upon overwrite recording being provided between the recording areas 1, 2 and 3.

FIGS. 7B–7E show in detail the arrangements of single synchronizing blocks of the timing sector TS, the audio signal, the image signal, and subcode, respectively. The signals have in common a synchronizing area of 5-bytes comprised of 3-bytes of IDs (ID0, ID1, IDP (parity)] after 2-bytes (16 bits) of synchronizing data (SYNC).

FIG. 7B shows in detail the arrangement of one synchronizing block of the timing sector TS which is composed of 6 bytes, and includes 1-byte of dummy data after the earlier mentioned 5-byte synchronizing area which is common to the synchronizing blocks in the areas 0, 1, 2, and 3. Fifty-three of the synchronizing blocks shown in FIG. 7B are joined together to form the timing sector in the area 0 on each track. A servo signal (usually called ATF signal) is written as a burst signal over the area 0 or over the entire track.

FIG. 7C shows the arrangement of one synchronizing block of the audio signal sector or area 1. The synchronizing block is composed of 90 bytes, and includes 77-bytes of data and 8-bytes of the error-correcting code C1 after the 5-byte synchronizing area. As described later on, with reference to FIG. 8A 10 synchronizing blocks of the structure shown in FIG. 7C and error-correcting code C2 corresponding to 4 synchronizing blocks are joined together to form the audio signal in the area 1 on one track.

FIG. 7D shows the arrangement of one synchronizing block of the image or video signal in the area 2. The synchronizing block is composed of 90 bytes, and includes 77-bytes of data and 8-bytes of error-correcting code C1 after the 5-byte synchronizing area. As described later on, 135 synchronizing blocks of the structure shown in FIG. 7D and error-correcting code C2 corresponding to 11 synchronizing blocks are joined together to form the image or video sector or area 2 on one track.

FIG. 7E shows the arrangement of one synchronizing block of the subcode in the area 3. Such synchronizing block is composed of 12 bytes, and includes 5-bytes of data and 2-bytes of error-correcting code C1 after the 5-byte synchronizing area. As described later on, 12 synchronizing blocks of subcode are joined together to form the subcode sector or area 3 on one track.

Figures 8A, 8B, 8C:
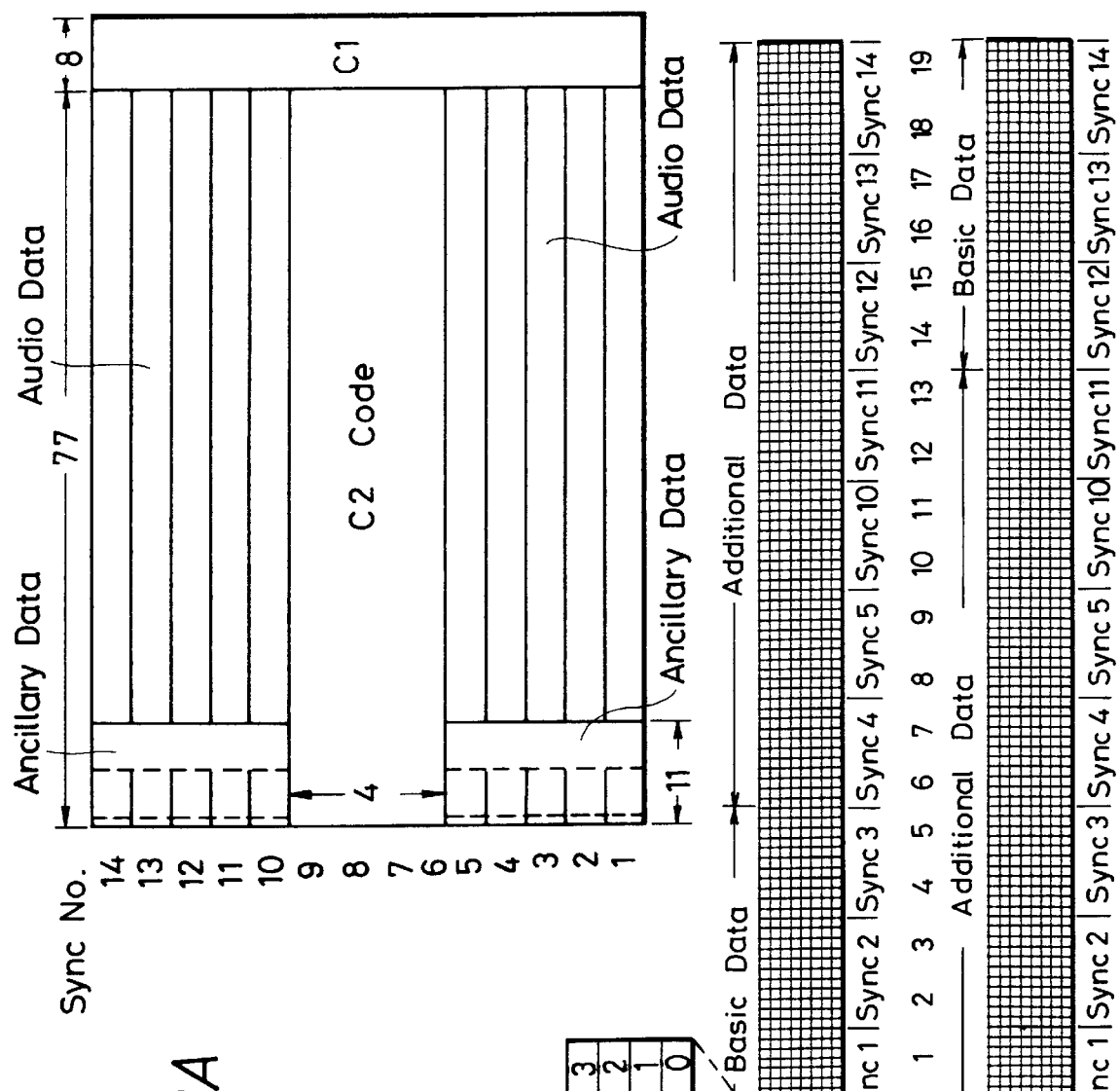
FIGS. 8A–8C are diagrams showing a data structure of an audio signal recorded on one track.

As shown more specifically on FIG. 8A, the audio signal sector on one track is composed of error correction code C2 corresponding to four synchronizing blocks provided between two sets of 5 synchronizing blocks of audio identified as Sync. Nos. 1–5 and Sync. Nos. 10–14, respectively. An area for 6-bytes of ancillary data is added to the starting end of each of the synchronizing blocks of audio identified as Sync. Nos. 1–5 and Sync. Nos. 10–14.

As shown in FIGS. 8B and 8C, this area of ancillary data contains application IDs in the four high-order bits of a first byte and is followed by two data recording packs which are each of 5 bytes. Such four bits of application IDs define the AP1 for the audio signal recorded in area 1.

On one track recorded by an A head, the ancillary data area is formed as shown in FIG. 8B, while FIG. 8C shows data recorded by a B head. Twenty of the data recording packs numbered 0–19 are formed for each of the A and B heads.

In FIG. 8B, the data recorded by the A head include basic data in six packs (0–5) corresponding to the synchronizing blocks Nos. 1–3, and additional data in the remaining fourteen packs (6–19). In FIG. 8C, the data recorded by the B head include basic data in six packs (14–19) corresponding to the synchronizing blocks Nos. 12–14, and additional data in the remaining fourteen packs (0–13). The packs of the basic data are written by the A and B heads, respectively, in order to cope with a dropout of data in one channel due to head clogging, and the positions at which the A and B heads record the basic data are displaced relative to each other in order to cope with dropouts due to lateral scratches on the tape.

As shown in FIG. 9A, in each track, the image or video signal recorded in the area 2 is composed of 135 synchronizing blocks of video and error correcting code C2 corresponding to 11 synchronizing blocks. The 135 synchronizing blocks are divided into twenty seven buffering blocks numbered BUF0–BUF26 each composed of 5 synchronizing blocks. As shown in FIG. 9B, in each buffering block, an area for 3 bytes of ancillary data is provided after the synchronizing area in the starting end portion of each of the synchronizing blocks. This area for ancillary data contains a first byte (QNO) of quantization data including data indicative of a quantization level (Q number) in its four lower-order bits and data indicative of a quantization level switching point in the remaining four bits. The area for ancillary data also contains second and third bytes (AUX0, AUX1). These second and third bytes of the five synchronizing blocks constituting a buffering block, that is, a total of ten bytes of each buffering block, are divided into former and latter halves each composed of 5 bytes, and each of these former and latter halves contains ancillary data, closed caption data, and teletext data.

FIG. 10A shows the 5 bytes of the former half of the bytes provided for ancillary data in each of the 27 buffering blocks on one track. The four high-order bits of the second byte (AUX0) of the first synchronizing block of each buffering block contain application ID data, that is, define AP2 for the image or video signal recorded in area 2. The next bit contains data indicating a frame frequency (50/60), and the three low-order bits contain signal type information, for example, indicative of standard, wide and high definition television (HDTV). The remaining 4 bytes of the former half, of the bytes provided for ancillary data in each buffering block that is, from the third byte (AUX1) of the first synchronizing block to the second byte (AUX0) of the third synchronizing block, contain teletext data.

The 5 bytes of the latter half, of the bytes provided for ancillary data in each of the buffering blocks that is, from the third byte (AUX1) of the third synchronizing block to the third byte (AUX1) of the fifth synchronizing block of each of 27 buffering blocks on one track form a data recording pack. Twenty-seven data recording packs (numbered 0–26) are formed for each of the A and B heads, with FIG. 10B illustrating data recorded by the A head, and FIG. 10C illustrating data recorded by the B head.

As shown in FIG. 10B, the data recorded by the A head include basic data in 6 packs corresponding to the buffering blocks BUF0–BUF5 on the starting end portion of the respective track and additional data in 20 packs corresponding to the buffering blocks BUF5–BUF25. As shown in FIG. 10C, the data recorded by the B head include additional data in 20 packs corresponding to the buffering blocks BUF0–BUF19 on the starting end portion of the respective track and basic data in 6 packs corresponding to the buffering blocks BUF20–BUF25.

Once again, the packs of the basic data are written respectively by the A and B heads in order to cope with dropout of the data in one channel due to head clogging, and the recorded positions are displaced relative to each other in order to cope with dropout due to lateral scratches on the tape. The 5 bytes of the latter half in the last buffering block BUF26, that is, from the third byte (AUX1) of the third synchronizing block to the third byte (AUX1) of the fifth synchronizing block in the buffering block BUF26, are also used as an area for storing teletext for both the A and B heads. Therefore, there are 26 data recording packs per track.

Figure 11:
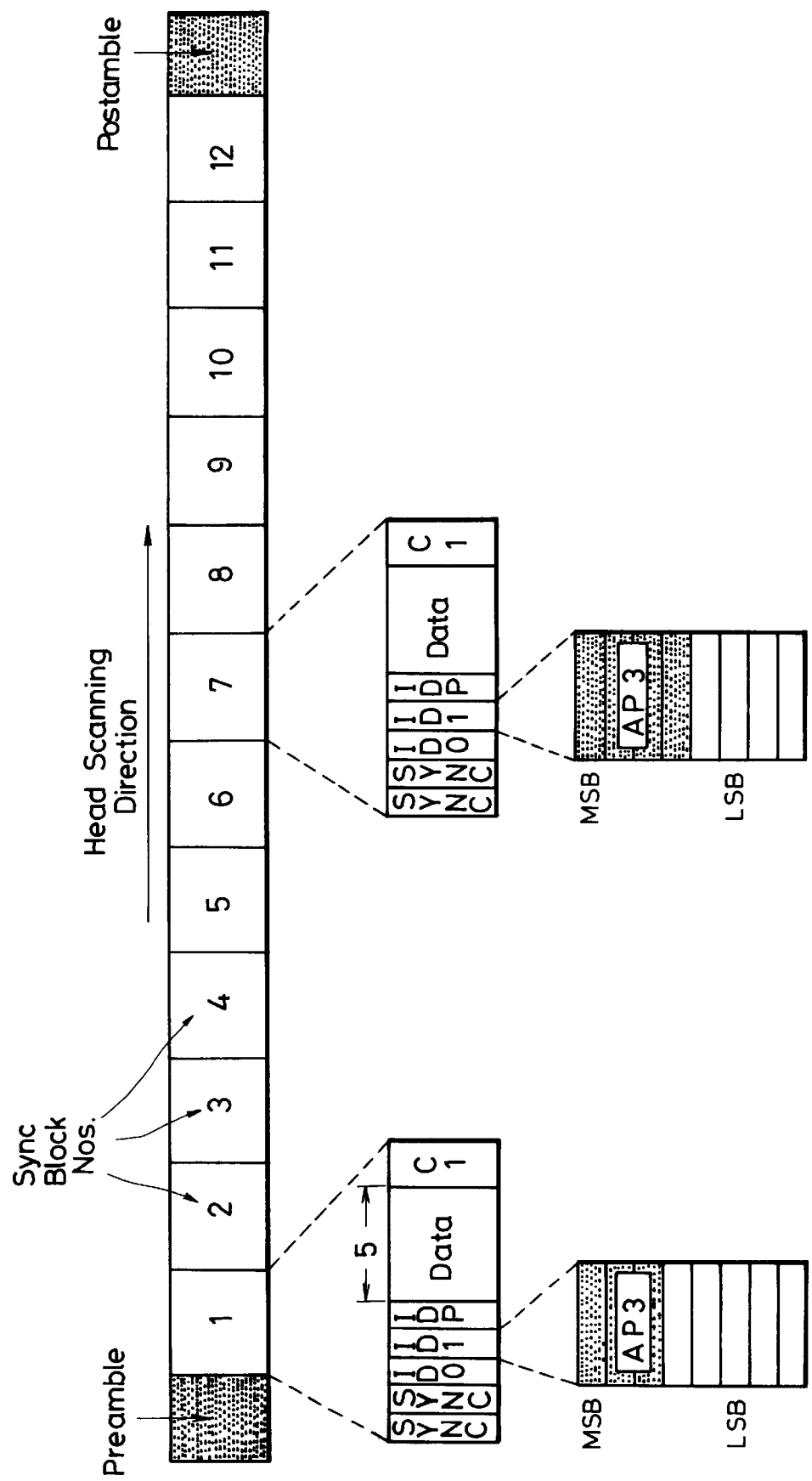
FIG. 11 is a diagram showing a data structure of a subcode recorded on one track.

As shown in FIG. 11, the subcode signal recorded in the area 3 of each track is composed of 12 subcode synchronizing blocks 1~12. 5-bytes of data in each of these synchronizing blocks are referred to as one pack, and 12 packs are formed on one track. Application ID, that is, AP3, is provided in the four high-order bits of a byte ID1 which is the second ID byte following the bytes of synchronizing data in the synchronizing area of each of the subcode synchronizing blocks 1 and 7.

In the digital image and audio signal recording and reproducing apparatus, the 58 packs recorded on one track and which include 20 packs of the audio synchronizing blocks 1~5 and 10~14, 26 packs of the second and third bytes in the image or video synchronizing blocks, and 12 packs of the subcode synchronizing blocks, have pack structures of the same data structure.

The data in the memory of the cassette (MIC) also have the same pack structure.

In recording and reproducing signals in accordance with a method embodying this invention, as described above, the synchronizing area of each of the timing, audio, video and subcode sectors or areas 0, 1, 2 and 3 has a common structure in which 2-bytes (16-bits) of synchronizing data are followed by 3-bytes of IDs [ID0, ID1, and IDP (parity)].

As shown in FIGS. 12A~12D, the two high-order bits of ID0 indicate the type of sector, for example, (11) indicates a timing sector TS, (01) indicates an audio sector, (00) indicates an image sector and (10) indicates a subcode sector.

In the case of the timing sector (FIG. 12A), the third bit of ID0 serves to distinguish standard recording SP(0) and long-play recording LP(1) from each other. Application ID, that is, APT, is stored in the four low-order bits of ID0, with the same data being repeatedly stored in 53 locations on each track.

The six low-order bits of ID1 in the timing sector TS indicate synchronizing block numbers in the timing sector or area 0 of a track, and numbers 1~53 are assigned to the 53 synchronizing blocks, respectively. The fourth bit of ID0 and the two high-order bits of ID1 are reserved for additional data.

As shown in FIG. 12B, in each synchronizing area of the audio sector, the third bit of ID0 identifies the first half (FRID=1) or the second half (FRID=0) of a video frame. The five low-order bits in ID0 indicate the track number, while the four low-order bits in ID1 indicate the audio sync block number. Finally, in each synchronizing area of the audio sector, the four high-order bits are reserved for additional data.

As shown in FIG. 12C, in each synchronizing area of the video or image sector, the third bit of ID0 again indicates the first or second half of a video frame, while the five low-order bits of ID0 indicate the track number. Further, the eight bits of ID1 indicate the image or video synchronizing block numbers.

In the case of subcode sector (FIG. 12D), ten bits of control ID, that is CTID, are provided in the six low-order bits of ID0 and also in the four high-order bits of ID1 in the 2–6 and 8–12 subcode synchronizing blocks. However, as earlier noted with reference to FIG. 11, in the cases of synchronizing blocks 1 and 7 in the subcode sector, application ID, that is, AP3, is stored in the four high-order bits of the second byte ID1 of the synchronizing area.

Apart from the foregoing, the application ID for the audio signals, that is, AP1, is recorded at ten locations on each track in the ancillary data areas, as has been described with reference to FIGS. 8A–8C. Similarly, the application ID for the video or image signals, that is, AP2, is recorded at twenty-seven locations on each track in the ancillary data areas, as has been described with reference to FIGS. 9A–9B and 10A–10C.

Therefore, by way of summary, it may be noted that, in the described embodiment of the invention, the application ID (APT) for the track appears at 53 locations in the timing sector of the track, the application ID (AP1) for the audio signal appears at 10 locations on the track, the application ID (AP2) for the video signals appears at 27 locations on the track and the application ID (AP3) for the subcodes appears at 2 locations on the track.

Assuming that all of the application IDs, APT, AP1, AP2 and AP3 are intended to be 0000 for proper reproduction by a digital signal recording and reproducing apparatus, such as, a CVCR, if a cassette having an APT value other than 0000 in the timing sectors of its tracks is installed in the apparatus, the reproduction of audio and image signals is muted, and the inside of the entire track is opened and brought into conformity with the content of the detected APT.

Since APT in the timing sector TS is the most important data of the signals, that data is repeatedly stored in 53 locations on one track, and a decision by majority is employed to avoid detection errors.

The application IDS are recorded 10 times as AP1 in the audio signal area 1 on one track, 27 times as AP2 in the image signal area 2 on one track, and twice as AP3 in the subcode area 3 on one track. Since the same data defining AP1, AP2 and AP3 are repeated in each track, a decision by majority is also here employed to avoid detection errors.

The repetitive appearance of the application ID data in each track is of particular importance when employing a recording and reproducing apparatus using a compression technique, and in which the image signal is processed in compression units and hence the data thereof is reproduced in compression units. Each compression unit contains application ID, and its area is stipulated by application ID. Therefore, at least one application ID AP2 is necessarily required in each compression unit.

In a reproduction mode at a speed different from the recording tape speed, when a track is obliquely scanned, a situation which cannot be dealt with may arise unless at least one application ID AP2 is present in each compression unit.

In the case of the memory in cassette MIC, as earlier described, the application ID APM may be stored in the four high-order bits at the address 1 in the memory space, as shown in FIG. 5.

As earlier noted, the application IDS APT, AP1, AP2 and AP3 for the timing sector TS, the audio signal area 1, the image signal area 2 and the subcode area 3, respectively, may be stored in respective areas stipulated in a pack structure in which basic data indispensable for recording and reproducing a signal are provided.

In order to realize a digital platform using application IDs according to the present invention, at most one microcomputer (not shown) is sufficient to recognize such application IDs.

It will be appreciated that, in accordance with the present invention, a group of totally different commercial products can be realized using a common cassette and a common mechanism and employing some common electric circuit components. Thus, it is possible to make available economical products that may be used as a digital platform for the upcoming so-called digital world.

Although illustrative embodiments of the present invention have been described herein, it is to be understood that the invention is not limited thereto, and that various modifications and changes may be effected therein by one skilled in the art without departing from the scope and spirit of the invention as defined in the appended claims.

What is claimed is:

1. In a method for digitally recording and reproducing information data in successive oblique tracks on a recording tape by means of rotary heads scanning said tracks in succession, the improvement comprising the steps of:

providing a timing area adjacent only an entrance end of each of said tracks at which said heads first come into scanning contact with said tape;

repetitively recording in said timing area of each of said tracks, at respective locations spaced apart in said timing area in a direction of said scanning along the respective track, identification data comprised of at least three bits which stipulate a corresponding data structure for the track including a number of additional areas following said timing area in a direction away from said entrance end of the respective track for the recording by said heads in said additional areas of plural blocks of respective information data and data ancillary thereto; and repetitively adding, to said ancillary data of said blocks recorded in each of said additional areas, respective additional identification data which have the same data structure as said identification data recorded in said timing area and which stipulate a data structure for the information data recorded in the respective additional area independently of said data structure stipulated for said track by said identification data recorded in said timing area and also independently of the data structure stipulated for any other one of said additional areas by said respective additional identification data added to said ancillary data of the blocks recorded in said other additional area, with said additional identification data being recorded in the respective additional areas at respective locations which are spaced apart along the respective additional areas in said direction of the scanning along the track.

2. A method according to claim 1; in which said recording tape is contained in a cassette which further contains a memory; and further comprising storing in said memory identification data which are the same as said identification data in said timing area of each track and which stipulate a data structure of said memory.

3. A method according to claim 1; in which said identification data in said timing area further stipulate arrangements of Sync. blocks and of error correcting codes in said additional areas for the recording of said information data and the data ancillary thereto.

4. A method according to claim 3; in which said data structure of the track includes a further area for the recording of subcode data therein; and further comprising repetitively adding to said subcode data in said further area respective further identification data which are of said same data structure as said identification data recorded in said timing area and which stipulate a data structure for the subcode data recorded in said further area independently of the data structures stipulated for said track or for any of said additional areas by the respective identification data in said timing area and in said additional areas, respectively, said further identification data being disposed at respective locations spaced apart in said further area in said direction of the scanning along the track.

5. In a method for digitally recording and reproducing various types of information data in successive oblique tracks on a recording tape in a standardized cassette by means of rotary heads scanning said tracks in succession, the improvement comprising the steps of:

providing a timing area adjacent only an entrance end of each of said tracks at which said heads first come into scanning contact with said tape;

recording in said timing area of each of said tracks a plurality of timing signal synchronizing blocks which each include at least three bits of identification data stipulating a data structure for the track including a number and positions of additional areas following said timing area in a direction away from said entrance end of the respective track, with said identification data of the timing signal synchronizing blocks being disposed at respective locations spaced apart in said timing area in a direction of said scanning along the respective track; and recording in each of said additional areas plural synchronizing blocks of respective information data and data ancillary thereto which include respective additional identification data having the same data structure as said identification data recorded in said timing area and which stipulate a data structure for the information data recorded in the respective additional area independently of said data structure stipulated for said track by identification data recorded in said timing area and also independently of the data structure stipulated for any other one of said additional areas by said respective additional identification data included in said ancillary data of the synchronizing blocks recorded in said other additional area, with said additional identification data of said synchronizing blocks of information data being disposed at respective locations spaced apart in said respective additional areas in said direction of said scanning along the track.

6. A method according to claim 5; in which said identification data in said timing area further stipulate arrangements of error correcting codes in said additional areas for the recording of said information data and the data ancillary thereto.

7. A method according to claim 5; in which said recording tape is contained in a cassette which further contains a memory; and further comprising storing in said memory identification data which stipulate a data structure of said memory and which are the same as said identification data in said timing area of each track.

8. A method according to claim 5; in which said data structure of the track includes a further area for the recording of synchronizing blocks of subcode data therein; and further comprising repetitively adding to a plurality of said synchronizing blocks of subcode data recorded in said further area respective further identification data which are of said same data structure as said identification data recorded in said timing area and which stipulate a data structure for the subcode data recorded in said further area independently of the data structures stipulated for said track or for any of said additional areas by the respective identification data in said timing area and in said additional areas, respectively, said further identification data being disposed at respective locations distributed along said further area in said direction of said scanning along the respective track.

* * * * *